United States Patent [19]
Swift

[11] 3,718,227
[45] Feb. 27, 1973

[54] COMBINATION BOAT-AUTOMOBILE TRAILER

[76] Inventor: Merle E. Swift, 161 Lynnwood, North East, Pa. 16428

[22] Filed: Feb. 11, 1971

[21] Appl. No.: 114,617

[52] U.S. Cl. .................................. 214/512, 296/1 A
[51] Int. Cl. ................................................ B60p 3/08
[58] Field of Search ........... 214/85.5, 500, 512, 77 R; 280/414; 296/1 A, 23 MC

[56] References Cited

UNITED STATES PATENTS

| 3,449,010 | 6/1969 | Hoy | 296/1 A |
| 2,617,368 | 11/1952 | McCormick | 296/1 A X |
| 2,881,023 | 4/1959 | Gile et al. | 280/414 R X |

FOREIGN PATENTS OR APPLICATIONS

| 1,279,191 | 5/1962 | France | 296/1 A |

Primary Examiner—Albert J. Makay
Attorney—Charles L. Lovercheck

[57] ABSTRACT

A semi-trailer is disclosed for supporting both a boat, a boat trailer and an automobile. The trailer has a frame with a hoist on it adapted to carry a boat and boat trailer in an elevated position and to carry an automobile on the trailer below the boat.

6 Claims, 4 Drawing Figures

PATENTED FEB 27 1973

Inventor
MERLE E. SWIFT

By Charles L Lauerhuf

Attorney

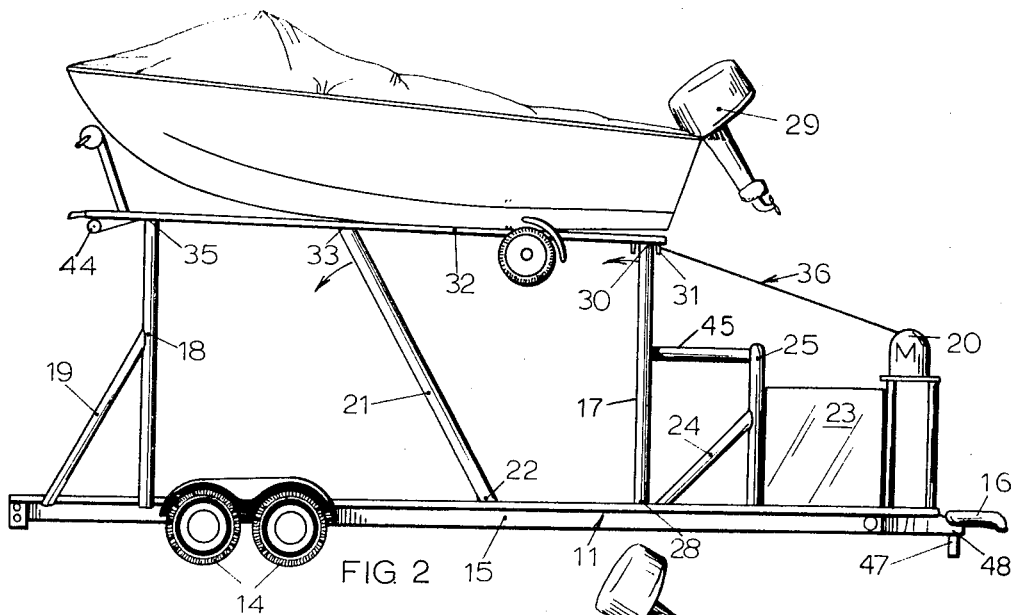
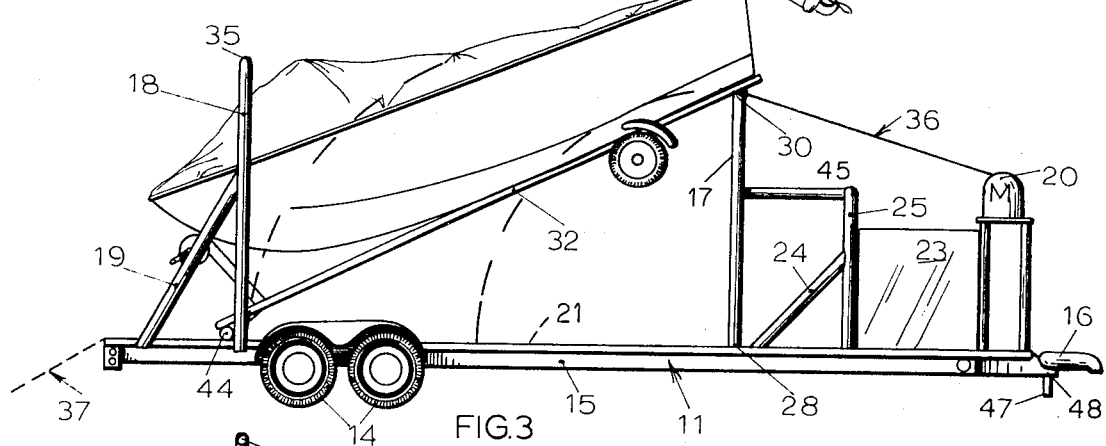
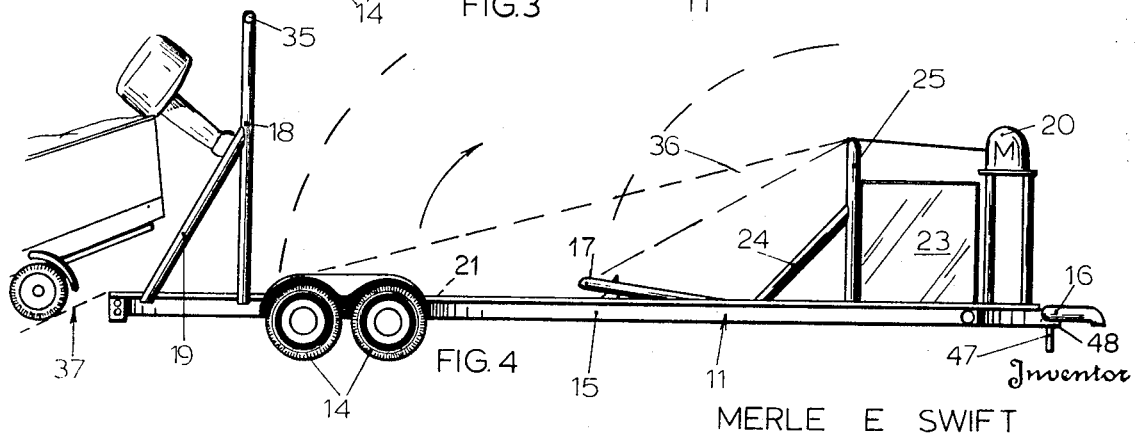

A COMBINATION BOAT-AUTOMOBILE TRAILER

STATEMENT OF INVENTION

This invention relates to boat trailers and, more particularly, to a combination boat and automobile trailer.

OBJECTS OF THE INVENTION

It is an object of the invention to provide an improved boat trailer.

Another object of the invention is to provide a trailer for transporting a boat and an automobile.

Another object of the invention is to provide a trailer that is simple in construction, economical to manufacture, and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

GENERAL DESCRIPTION OF THE DRAWINGS

FIG. 2 is a side view of the trailer shown in FIG. 1 with the automobile removed.

FIG. 3 is a view of the trailer with the automobile removed and with the forward boat supporting links swung to horizontal position.

FIG. 4 shows the trailer with boat and automobile both removed.

DETAILED DESCRIPTION OF THE DRAWINGS

Figure 1:
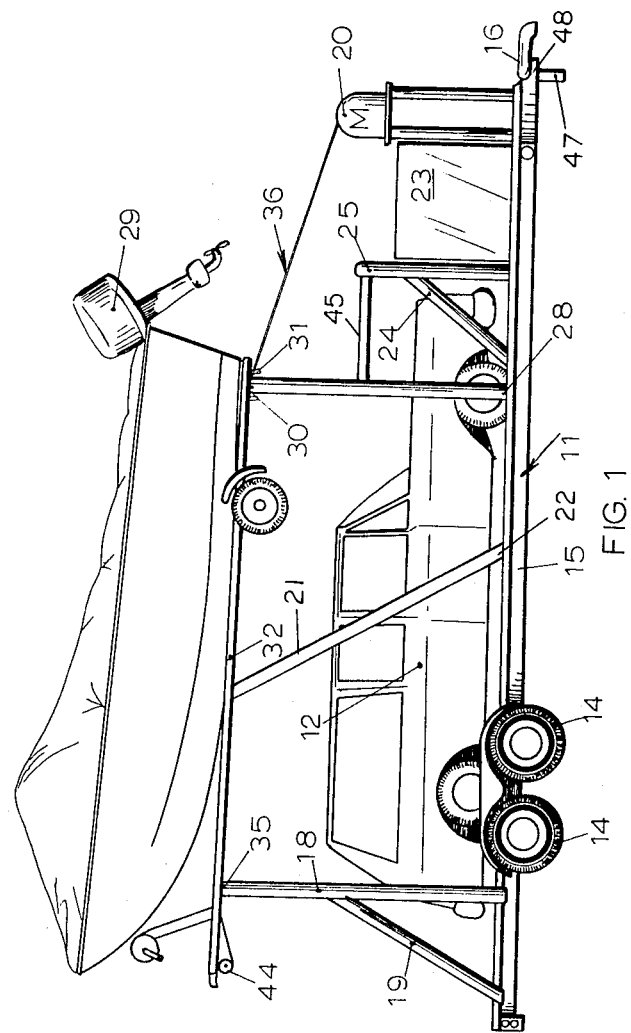
FIG. 1 is a side view of the trailer with an automobile and boat on the trailer in position to be transported behind a towing vehicle.

Now with more particular reference to the drawings, the boat trailer is indicated generally at 11 to be pulled behind a towing vehicle, which may be a self-propelled mobile home or the like. The trailer is shown supporting an automobile 12 and a boat 13. The trailer has tandem wheels 14. The trailer has a conventional type of trailer frame 15 which will be strong enough to support both the automobile and the boat. The trailer has a hitch 16 at its front end for attaching it to a towing vehicle.

Laterally spaced links 17 are swingably connected to the trailer frame at 28 and they have a cross bar 30 which receives the spaced pins 31 on the rear frame 32 of the boat trailer. The laterally spaced links 21 are swingably attached to the trailer frame 11 at 22 and they have a laterally extending bar 33 which engages the bottom side of the boat trailer likewise.

The column 18 is fixed to the frame 15 and has a brace 19 welded to the boat trailer frame 11 at its lower end and to the columns 18 at its upper end. A pin at 35 is slidable out of a hole in the upper end of the links 18. The pin provides a cross member. The winch rope 36 is connected to a winch 20 and the winch rope is connected to bar at 33 and bar at 30, not shown, which provides a cross member. Thus the boat trailer 32 may be brought up the ramp 37 and the pins 31 straddle the cross member 30. The member 33 may be fixed to the lower end of the frame 32 and the rope tightened to swing the links 21 and 17 through the dotted line position shown in FIG. 3 to the position shown in FIG. 2. The rod 35 will then be slid in place under the front end of the trailer frame 32 and the boat trailer will then be in position for transportation. The automobile 12 may then be driven up the ramp 37 to the position shown in FIG. 1 and the trailer will be in position to connect to the back end of the towing vehicle for transportation. The brace 24 and the column 25 are then attached to links 17 and they hold the links 17 in rigid position for towing through link 45 which is removably attached to column 25 and to link 17. A trunk 23 is supported on the trailer behind the winch stand 41 for storing various articles of camping gear. The stand 47 may be pivoted to the tongue at 48 so that it can be folded up when the trailer is being towed.

When it is desired to unload the automobile 12 and the boat 13, the procedure described above is reversed. Then the trailer hitch on the rear of the automobile may be connected to the trailer hitch 44 on the trailer 32 for towing the boat trailer to a vacation or camping site.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. An automobile trailer having a frame for transporting an automobile and a boat on a trailer,
   hoist means on said automobile trailer for engaging said boat trailer frame for lifting said boat trailer to an elevated position on said frame for transportation,
   means to support said boat trailer for transportation in said elevated position while said automobile trailer is being towed behind a towing vehicle and a place for an automobile on said automobile trailer frame below said boat trailer support,
   means on said automobile trailer whereby said automobile may be supported on its wheels below said boat,
   said means for lifting said boat comprises,
   two laterally spaced first swinging arms hinged to said frame at a first position,
   said means to support said boat trailer comprising two laterally spaced second arms hinged to said frame at a second position,
   means on the distal ends of said arms for engaging means on a boat trailer,
   said arms being swingable to a position generally parallel to said trailer for lowering said boat,
   and means on said trailer for swinging at least one said arm to a vertical position whereby said boat is lifted to an elevated position,
   two laterally spaced columns are fixed to said trailer at a position spaced from said arms,
   said columns providing a space therebetween for said boat to be lifted to an elevated position,
   and means supported on said columns for supporting one end of said boat in elevated position.

2. The trailer recited in claim 1 wherein two spaced second columns are provided rigidly attached to said trailer for attaching said first swinging arms thereto.

3. The trailer recited in claim 2 wherein said second arms are adapted to engage a said boat trailer with said boat thereon.

4. The trailer recited in claim 3 wherein said laterally spaced arms and said laterally spaced columns are sufficiently spaced to receive an automobile therebetween on said trailer.

5. A basic trailer for carrying a boat trailer and an automobile comprising, a basic trailer frame adapted to support an automobile thereon, a first column fixed to said trailer adjacent its forward end, spaced columns fixed to said trailer adjacent its rear end, two first laterally spaced links pivoted to said frame at their end, means on the distal ends of said spaced links for connecting to a boat trailer frame whereby one end of said boat trailer frame may be swung upwardly, means on said first column to fasten said first links thereto in vertical position, spaced second links attached to said basic frame at their lower ends and means to connect said second links to said boat trailer frame at their upper ends whereby said boat trailer forward end may be swung upwardly, and means on said second columns for supporting said front end of said boat trailer in position when it is swung upward by said second links.

6. The basic trailer recited in claim 5 wherein a winch is supported on said basic frame and a line from said winch is attached to the distal end of said first links, and means for connecting said line to the distal end of said second links whereby said links may be swung upwardly with said boat trailer thereon.

* * * * *